April 17, 1962  J. W. McCULLEY  3,029,878
LAWN EDGER
Filed Nov. 12, 1957
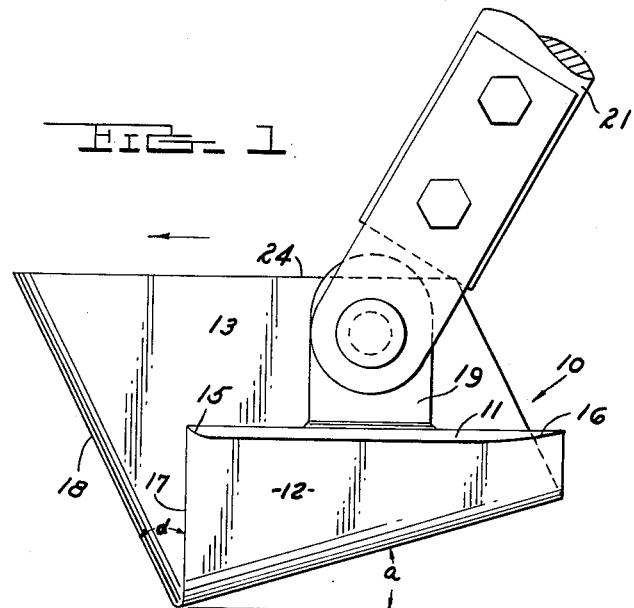
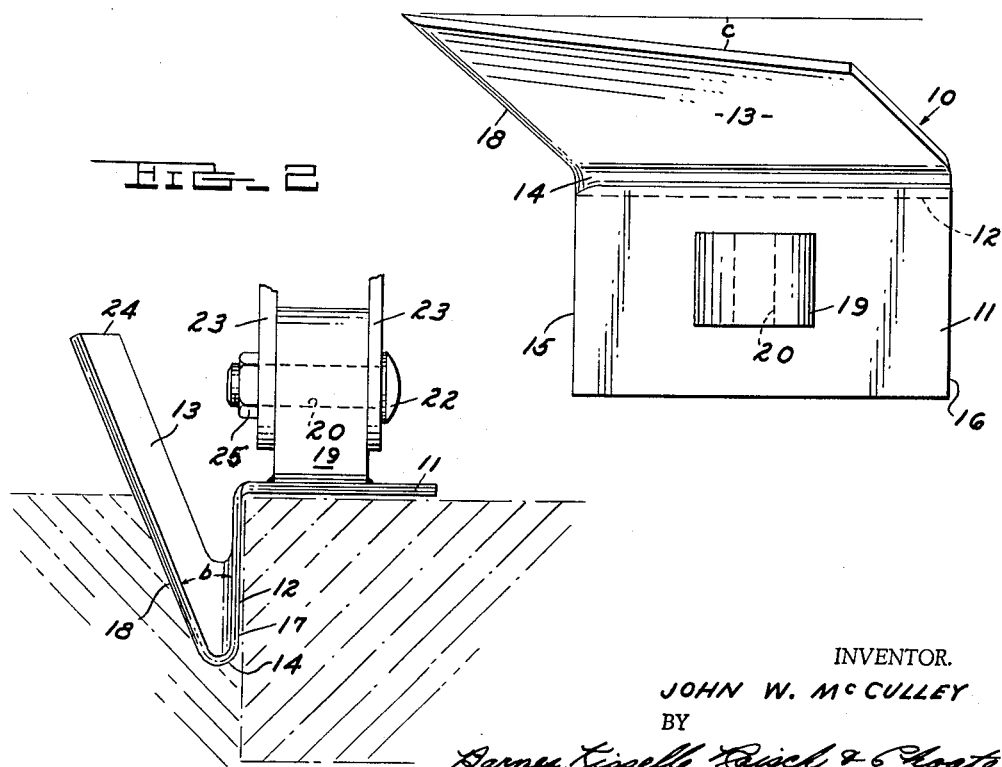
INVENTOR.
JOHN W. McCULLEY
BY
Barnes, Kisselle, Raisch & Choate
ATTORNEYS

United States Patent Office 3,029,878
Patented Apr. 17, 1962

3,029,878
LAWN EDGER
John W. McCulley, 2105 Kansas Ave., Flint, Mich., assignor of one-half to Samuel Kurtz, Flint, Mich.
Filed Nov. 12, 1957, Ser. No. 695,806
2 Claims. (Cl. 172—13)

This invention relates to lawn edgers.

It is an object of this invention to provide a lawn edger which effectively permits the trimming of the edge of the lawn along a sidewalk or driveway.

It is a further object of this invention to provide such a lawn edger which requires a minimum of physical effort in its use.

It is a further object of this invention to provide such a lawn edger which can be manufactured at low cost.

In the drawings:

FIG. 1 is a fragmentary side elevational view of a lawn edger embodying the invention.

FIG. 2 is an end elevational view of the lawn edger showing the lawn edger in use.

FIG. 3 is a plan view of the lawn edger.

As shown in the drawings the lawn edger 10 is made from a single piece of metal of substantially uniform thickness. Prior to being shaped into the form of the lawn edger, the piece of metal has parallel side edges.

The lawn edger 10 comprises a generally horizontal rectangular section 11 which is adapted to contact the upper surface of a sidewalk or driveway, a downwardly extending vertical section 12 which is adapted to contact the side edge of a sidewalk or driveway, and an inclined section 13 connected to the lower end of the vertical section 12 by a downwardly curved section 14.

As shown in FIG. 1 the under side of forward edge 15 of horizontal section 11 is curved upwardly and rear edge 16 is curved upwardly to facilitate the movement of the edger along the upper surface of the sidewalk. The forward edge 17 of vertical section 12 is substantially vertical and at right angles to the section 11. The forward edge 18 of the diverging section 13 extends upwardly and forwardly of the edge 17 (FIG. 1) preferably at an angle $d$ ranging between 25° and 35°. Edges 17 and 18 are sharpened to a knife sharpness by tapering the inner adjacent surfaces of the respective sections, for example, by grinding.

Inclined section 13 extends upwardly a substantial distance above the horizontal plane of section 11 equal to about twice the height of section 12. Upper edge 24 of section 13 is generally parallel to the plane of section 11 (FIG. 1).

The curved section 14 has a radius preferably of one-half to one inch and the under surface thereof extends upwardly and rearwardly as shown in FIG. 1 to form an angle $a$ with the horizontal which is preferably less than 15° and may range between 10° and 20°.

The angle $b$ which the inclined section 13 makes with vertical section 12 preferably ranges from 25° to 40° (FIG. 2).

As shown in FIG. 3 the top edge of inclined section 13 forms an angle with a vertical plane parallel to the plane of vertical section 12. This angle $c$ is preferably approximately 5°.

Means are provided on the upper surface of section 11 for mounting a handle and comprises a bracket 19 fixed to section 11 having an opening 20 therethrough extending generally laterally of the edger. The lower end of a handle 21 is pivoted to the bracket 19 by a bolt 22 passing through the spaced arms 23 on the lower end of the handle 21 and the opening 20 in the bracket. A bolt 25 locks the handle in any adjusted position relative to the lawn edger. This arrangement permits the angle of the handle to the edger to be adjusted so that it is most convenient to the user.

In use the lawn edger is pushed forwardly in the direction of the arrow shown in FIG. 1 with the under surface of section 11 contacting the upper surface of the sidewalk or driveway and the outer surface of section 12 contacting the side edge of the sidewalk or driveway. As the edger is moved forwardly the forward edge 18 of diverging section 13 first cuts the sod at a distance from the side edge of the walk and then the edge 17 of section 12 cuts the sod along the edge of the walk. The cut sod then freely passes upwardly between the sections 12 and 13 and out the rear of the edger. The sod thus has an unobstructed movement after it is cut and the lawn edger thus can be operated without clogging.

Although I do not wish to be bound by the theory involved, I believe that a factor in obtaining the beneficial results derived from the use of my lawn edger is that the edge 18 extends upwardly and forwardly from edge 17 to cut the sod before edge 17. In addition, the small angle $a$ formed by the lower edge of the curved section 14 provides a gradual passage for the cut sod preventing the sod from clogging the edger.

It can thus be seen that I have provided a lawn edger which is simple and easy to construct and which can be operated with a minimum of effort.

I claim:

1. A lawn edger made from a single piece blank of generally uniformly thick material having a generally uniform width and a continuous straight forward edge comprising a first substantially flat section extending generally horizontally and adapted to contact the top surface of a sidewalk, a second substantially flat section of substantially the same length as said first section bent from the blank in the direction of said width thereof on a line normal to said straight edge and extending downwardly at a generally right angle from one side of said first section and adapted to contact the edge of the sidewalk, a downwardly curved section of substantially similar cross sectional configuration throughout bent from said blank on a line inclined to said straight edge and extending from the lower edge of said second section, and a substantially flat inclined section extending upwardly and outwardly from the side of said downwardly curved section opposite said second section, the angle which the plane of said inclined section makes with the plane of said second section ranging between substantially 25° and 40°, the forward edge of said second section and said curved section lying in a substantially vertical plane and the forward edge of said inclined section extending upwardly and forwardly, all portions of the forward edge of said inclined section forming an angle ranging between substantially 25° and 35° with the forward edge of the second section, the forward edges of said second section, curved section and inclined section being tapered to provide cutting edges, the undersurface of said curved section being substantially straight and extending upwardly and rearwardly and forming a shallow angle with the horizontal of approximately 15°, the upper edge of said inclined section being higher than the upper edge of said second section and spaced above the first section and means on the upper surface of said first section only forming the sole connection to a handle whereby a free and unobstructed rearward passage for sod is provided in a substantially straight line between said inclined section and said second section.

2. A lawn edger made from a single piece blank of generally uniformly thick material and a continuous straight forward edge comprising a first substantially flat section extending generally horizontally and adapted to contact the top surface of a sidewalk, a second substantially flat section of substantially the same length as said first section bent from the blank in the direction of the width thereof on a line normal to said straight edge and extending downwardly at a generally right angle from one side of said first section and adapted to contact the edge of the sidewalk, a downwardly curved section of substantially similar cross sectional configuration throughout bent from said blank on a line inclined to said straight edge and extending from the lower edge of said second section, and a substantially flat inclined section extending upwardly and outwardly from the side of said downwardly curved section opposite said second section, the angle which the plane of said inclined section makes with the plane of said second section ranging between substantially 25° and 40°, the forward edge of said second section and said curved section lying in a substantially vertical plane and the forward edge of said inclined section extending upwardly and forwardly, all portions of the forward edge of said inclined section forming an angle ranging between substantially 25° and 35° with the forward edge of the second section, the forward edges of said second section, curved section and inclined section being tapered to provide cutting edges, the undersurface of said curved section being substantially straight and extending upwardly and rearwardly and forming a shallow angle with the horizontal, the upper edge of said inclined section being higher than the upper edge of said second section and spaced above the first section and a handle secured to one of said sections and located such that a free and unobstructed rearward passage for sod is provided in a substantially straight line between said inclined section and said second section.

References Cited in the file of this patent

UNITED STATES PATENTS

| | | |
|---|---|---|
| 813,539 | Vincent | Feb. 27, 1906 |
| 930,396 | Louden | Aug. 10, 1909 |
| 962,785 | Reichert | June 28, 1910 |
| 1,060,445 | Fields | Apr. 29, 1913 |
| 2,041,179 | Higbee | May 19, 1936 |
| 2,787,057 | Bell | Apr. 2, 1957 |